(12) United States Patent
Maxwell et al.

(10) Patent No.: US 10,581,909 B2
(45) Date of Patent: Mar. 3, 2020

(54) SYSTEMS AND METHODS FOR ELECTRONIC SIGNING OF ELECTRONIC CONTENT REQUESTS

(71) Applicant: Oath Inc., Dulles, VA (US)

(72) Inventors: Lachlan A. Maxwell, Ashburn, VA (US); Andrew Braksator, Herndon, VA (US); George Fletcher, Round Hill, VA (US)

(73) Assignee: Oath Inc., Dulles, VA (US)

( * ) Notice: Subject to any disclaimer, the term of this patent is extended or adjusted under 35 U.S.C. 154(b) by 262 days.

(21) Appl. No.: 15/633,289

(22) Filed: Jun. 26, 2017

(65) Prior Publication Data

US 2018/0375664 A1 Dec. 27, 2018

(51) Int. Cl.
*H04L 29/06* (2006.01)
*H04L 9/32* (2006.01)
*H04L 9/08* (2006.01)
*H04L 9/14* (2006.01)
*H04L 9/30* (2006.01)

(52) U.S. Cl.
CPC ........ *H04L 63/1483* (2013.01); *H04L 9/0894* (2013.01); *H04L 9/14* (2013.01); *H04L 9/30* (2013.01); *H04L 9/3247* (2013.01); *H04L 63/0428* (2013.01); *H04L 63/10* (2013.01); *H04L 63/126* (2013.01); *H04L 2209/60* (2013.01)

(58) Field of Classification Search
CPC ..... H04L 9/3247; H04L 9/30; H04L 63/1483; H04L 63/0428; H04L 63/10
See application file for complete search history.

(56) References Cited

U.S. PATENT DOCUMENTS

| | | | |
|---|---|---|---|
| 9,239,907 B1* | 1/2016 | Park | G06F 21/56 |
| 2001/0032314 A1* | 10/2001 | Ansper | H04L 9/3247 |
| | | | 713/176 |
| 2004/0054750 A1* | 3/2004 | de Jong | H04L 29/06027 |
| | | | 709/217 |
| 2006/0041754 A1* | 2/2006 | Hind | G06F 21/31 |
| | | | 713/176 |

(Continued)

*Primary Examiner* — Robert B Leung
(74) *Attorney, Agent, or Firm* — Bookoff McAndrews, PLLC

(57) ABSTRACT

Systems and methods are disclosed for cryptographic signing of content requests. One method includes receiving, at a content network, a content request from a publisher website, the publisher website purporting to be associated with a publisher domain. At the content network, a public key may be received associated with the publisher domain. At the content network, at least one policy may be received associated with the publisher domain. It may be determined whether the content request comprises a cryptographic signature. If it is determined that the content request does not comprise a cryptographic signature, content may or may not be provided to the publisher website according to the policy from the publisher domain. If it is determined that the content request comprises a cryptographic signature, the cryptographic signature of the request may be validated using the public key. Upon successfully validating the cryptographic signature of the content request, content maybe provided to the publisher website according to the content request.

20 Claims, 4 Drawing Sheets

(56) References Cited

U.S. PATENT DOCUMENTS

| | | | |
|---|---|---|---|
| 2009/0144138 A1* | 6/2009 | Nomula | G06Q 30/00 705/14.65 |
| 2013/0074158 A1* | 3/2013 | Koskimies | H04L 63/0428 726/4 |
| 2015/0180843 A1* | 6/2015 | Parrish | H04L 63/061 713/171 |
| 2015/0189017 A1* | 7/2015 | Amidei | H04L 67/1097 726/4 |
| 2015/0237053 A1* | 8/2015 | Duggana | H04L 63/10 726/4 |
| 2016/0373252 A1* | 12/2016 | Goldstein | H04L 9/06 |
| 2017/0032413 A1* | 2/2017 | McCartney | G06Q 30/0248 |
| 2017/0141926 A1* | 5/2017 | Xu | H04L 9/3247 |

* cited by examiner

SYSTEMS AND METHODS FOR ELECTRONIC SIGNING OF ELECTRONIC CONTENT REQUESTS

TECHNICAL FIELD

Various embodiments of the present disclosure relate generally to cryptographically signing electronic content requests. More specifically, exemplary embodiments of the present disclosure relate to systems and methods of cryptographic signing of electronic content requests to validate ownership of websites for fraud prevention.

BACKGROUND

Legitimate websites, online users, and content networks have been the targets of various forms of fraudulent electronic activity since the advent of the Internet. Past techniques might install, on the computers of unsuspecting owners, malicious software that engages in abusive behavior. Such software, for example, may engage in spamming, pagejacking, and/or botnet click fraud.

Techniques for committing botnet click fraud have become increasingly sophisticated. Malicious entities may set up fraudulent websites visited by no real users yet purporting to be owned by reputable publishers. These fraudulent websites may then request content from content networks, such as advertising networks. The malicious entities may also operate a bot network, or botnet, that simulates the browsing of legitimate web users. These simulated web users may visit the fraudulent websites and generate clicks on the provided content. In this manner, content providers and content networks may be defrauded.

SUMMARY OF THE DISCLOSURE

According to certain embodiments, a method is disclosed for validating the identity of publisher websites. The method may include receiving, at a content network, a content request from a publisher website, the publisher website purporting to be associated with a publisher domain; receiving, at the content network, a public key associated with the publisher domain; receiving, at the content network, at least one policy associated with the publisher domain; determining, at the content network, whether the content request comprises a cryptographic signature; upon determining, at the content network, that the content request does not comprise a cryptographic signature, providing or not providing content to the publisher website according to the policy from the publisher domain; upon determining, at the content network, that the content request comprises a cryptographic signature, validating the cryptographic signature of the request using the public key; and upon successfully validating the cryptographic signature of the content request, providing content to the publisher website according to the content request.

Various embodiments of such a method may include, in various combinations: wherein the publisher key is received from a Domain Name Server associated with the publisher domain; wherein the content network induces the publisher domain to add cryptographic signatures to content requests; upon determining that the content request does not comprise a cryptographic signature, forwarding information associated with the content request to the publisher domain; upon determining that the content request does not comprise a cryptographic signature, forwarding the content request to the publisher domain with a request for a corresponding cryptographic signature; upon successfully validating the cryptographic signature of the content request, providing content to the publisher website for additional content requests from the publisher website without validation; receiving a plurality of content requests from the publisher domain; and validating cryptographic signatures associated with the content requests in a batch. Various embodiments of such a method may also include, in various combinations; determining that the policy from the publisher domain requires all content requests associated with the publisher domain to be cryptographically signed; and upon determining that the content request does not comprise a cryptographic signature, denying the content request.

According to certain embodiments, a system is disclosed for validating the identity of publisher websites. The system may include a data storage device storing instructions for validating the identity of publisher websites; and a processor configured to execute the instructions to perform a method including receiving, at a content network, a content request from a publisher website, the publisher website purporting to be associated with a publisher domain; receiving, at the content network, a public key associated with the publisher domain; receiving, at the content network, at least one policy associated with the publisher domain; determining, at the content network, whether the content request comprises a cryptographic signature; upon determining, at the content network, that the content request does not comprise a cryptographic signature, providing or not providing content to the publisher website according to the policy from the publisher domain; upon determining, at the content network, that the content request comprises a cryptographic signature, validating the cryptographic signature of the request using the public key; and upon successfully validating the cryptographic signature of the content request, providing content to the publisher website according to the content request.

Various embodiments of such a system may include, in various combinations: wherein the publisher key is received from a Domain Name Server associated with the publisher domain; wherein the content network induces the publisher domain to add cryptographic signatures to content requests; upon determining that the content request does not comprise a cryptographic signature, forwarding information associated with the content request to the publisher domain; upon determining that the content request does not comprise a cryptographic signature, forwarding the content request to the publisher domain with a request for a corresponding cryptographic signature; upon successfully validating the cryptographic signature of the content request, providing content to the publisher website for additional content requests from the publisher website without validation; receiving a plurality of content requests from the publisher domain; and validating cryptographic signatures associated with the content requests in a batch. Various embodiments of such a system may also include, in various combinations; determining that the policy from the publisher domain requires all content requests associated with the publisher domain to be cryptographically signed; and upon determining that the content request does not comprise a cryptographic signature, denying the content request.

According to certain embodiments, a non-transitory computer-readable medium is disclosed for validating the identity of publisher websites. The non-transitory computer-readable medium may store instructions that, when executed by a computer, cause the computer to perform a method for validating the identity of publisher websites, the method including receiving, at a content network, a content request from a publisher website, the publisher website purporting to be associated with a publisher domain; receiving, at the content network, a public key associated with the publisher domain; receiving, at the content network, at least one policy associated with the publisher domain; determining, at the content network, whether the content request comprises a cryptographic signature; upon determining, at the content network, that the content request does not comprise a cryptographic signature, providing or not providing content to the publisher website according to the policy from the publisher domain; upon determining, at the content network, that the content request comprises a cryptographic signature, validating the cryptographic signature of the request using the public key; and upon successfully validating the cryptographic signature of the content request, providing content to the publisher website according to the content request.

Various embodiments of such a non-transitory computer-readable medium may include, in various combinations: wherein the publisher key is received from a Domain Name Server associated with the publisher domain; wherein the content network induces the publisher domain to add cryptographic signatures to content requests; upon determining that the content request does not comprise a cryptographic signature, forwarding information associated with the content request to the publisher domain; upon determining that the content request does not comprise a cryptographic signature, forwarding the content request to the publisher domain with a request for a corresponding cryptographic signature; upon successfully validating the cryptographic signature of the content request, providing content to the publisher website for additional content requests from the publisher website without validation; receiving a plurality of content requests from the publisher domain; and validating cryptographic signatures associated with the content requests in a batch. Various embodiments of such a non-transitory computer-readable medium may also include, in various combinations: determining that the policy from the publisher domain requires all content requests associated with the publisher domain to be cryptographically signed; and upon determining that the content request does not comprise a cryptographic signature, denying the content request.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

Figure 1:
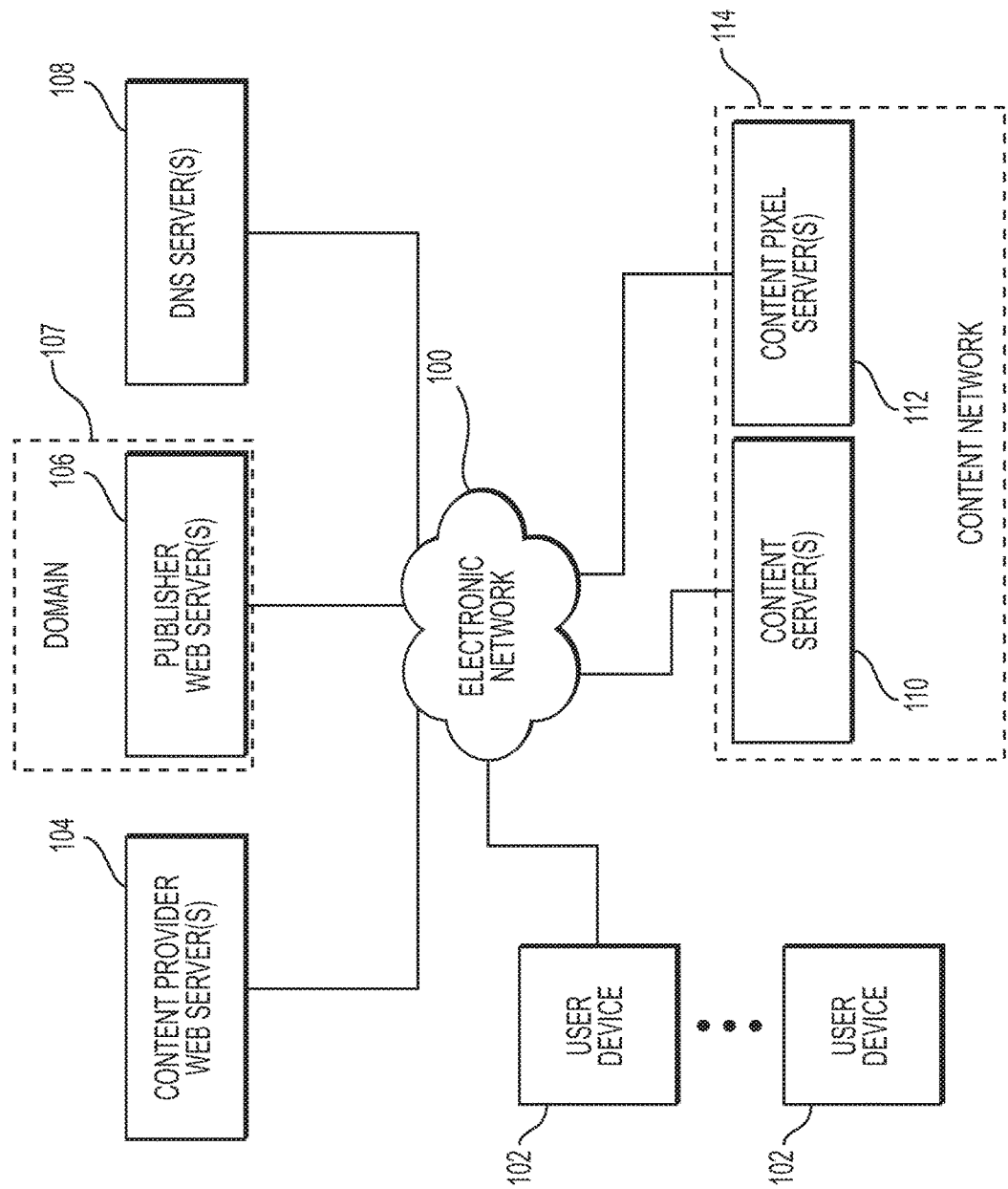
FIG. 1 is a schematic diagram of an environment in which electronic content providing may be performed and a system for electronic content distribution, according to an exemplary embodiment of the present disclosure.

FIG. 1 is a schematic diagram of an environment in which the provision, transmission, and/or distribution of electronic content (e.g., electronic display ads) may be performed consistent with these methods and systems for cryptographic signing of content requests, according to an exemplary embodiment of the present disclosure. Specifically, FIG. 1 illustrates an exemplary environment including a plurality of user device(s) 102, content provider web server(s) 104, publisher web server(s) 106, the publisher web server(s) 106 each being, or purporting to be, associated with at least one domain 107, DNS server(s) 108, content server(s) 110, and content pixel server(s) 112, all disposed in communication with an electronic network 100, such as the Internet. It should be appreciated that the word "content" as used herein should be construed so as to include advertising content (e.g., "ads"), whether in the form of electronic display ads, electronic videos, electronic GIFs, electronic text messages, or any other audio/visual representation of electronic content having a, human/user-facing communicative purpose.

In one embodiment, user devices 102 may be owned and used by one or more people, who may be viewers of webpages over the Internet, either through a mobile browser or web browser stored on respective user devices. User devices 102 may include any type of electronic device configured to send and receive data, such as websites and electronic advertisements, over electronic network 100. For example, user devices 102 may include a server, personal computer, tablet computer, mobile device, smartphone, personal digital assistant ("PDA"), and/or any Internet-enabled device disposed in communication with electronic network 100. For example, in one embodiment, each of user devices 102 may be a handheld device, such as an Apple iPhone, Apple iPad, Samsung Galaxy, Amazon Kindle, Microsoft Surface, or any other equivalent or similar device. Each user device 102 may have a web browser or mobile browser installed for receiving and displaying web and/or ad content from web servers. Thus, each user device 102 may be configured to receive and display data that is received from one or more of content provider web servers 104, publisher web servers 106, DNS servers 108, content servers 110, and/or content pixel servers 112, over electronic network 100.

As an example, in a common situation, a user may be visiting a publisher website (for example www.news.com) using a user device 102. The publisher website may include web content and a content pixel tag from a content pixel server 112. It should be appreciated that the content pixel tag may alternatively be thought of or referred to as a content pixel server configured to serve content tags or content requests such as "ad calls." In general, when a user device 102 visits a publisher website, the user device 102 may receive from the publisher both the web content and an electronic content request (sometimes referred to as an "ad call." Specifically, the user device 102 may receive, e.g., from a www.news.com web server 106 via a DNS server 108, both the content associated with the publisher website and, based on a content pixel tag, a content request including instructions, or code, for receiving a network cookie. The content request may call a content server 110 in content network 114.

Content provider web servers 104 may be owned and/or operated by any entities having content, and may provide online advertisements or other forms of media (e.g., embedded video, audio, visual displays, display ads, banner ads, pop-ups, etc.) desired to be delivered to online users. Content providers may interact with user devices 102, publisher web servers 106, DNS servers 108, content servers 110, and/or content pixel servers 112, through content provider web servers 104 connected to electronic network 100. Thus, content providers may be able to communicate information, such as ad information, targeting information, consumer information, budget information, bidding information, etc., to other entities in the environment of FIG. 1.

Publisher web servers 106 may be owned and/or operated by any entities having inventories of available online content space. For example, publishers may include online content providers, search engines, e-mail programs, or any other online site or program having online user traffic. Publishers may interact with user devices 102, content provider web servers 104, DNS servers 108, content servers 110, and/or content pixel servers 112, through publisher web servers 106 connected to electronic network 100. Thus, publishers may be able to communicate inventory information, such as site information, demographic information, cost information, etc., to other entities in the environment of FIG. 1.

DNS servers 108 may include name servers that host a network service for providing responses to queries against a directory service. Specifically, DNS servers 108 may map a human-recognizable identifier to a systematic, e.g., numeric, identification or addressing component according to a network service protocol, such as numeric Internet Protocol (IP) addresses. DNS servers 108 may also identify and locate computer systems, servers, and other resources on the Internet. DNS servers 108 may also store cryptographic keys, such as public keys, policy information related to, for example, content approval policies, approved/banned IP address listings, and/or other forms of data on behalf of publisher web server(s) 106, content provider web server(s) 104, and/or content networks 114. DNS servers 108 may interact with user devices 102, content provider web servers 104, publisher web servers 106, content servers 110, and/or content pixel servers 112 over electronic network 100.

Content servers 110 and content pixel servers 112 may include any type of servers configured to process content information from content providers and/or site information from publishers, and send and receive content requests and information from user devices 102, either directly or indirectly. In one embodiment, content servers 110 and/or content pixel servers 112 may be owned and operated by a content network 114. Content network 114 may be a business that receives content buys from content providers, and serves electronic content on inventory supplied by publishers. Thus, content network 114 may collect money from content providers, and purchase impressions from publishers.

In certain embodiments, content servers 110 and content pixel servers 112 may be remote web servers that receive advertising information from advertisers and serve electronic content items to be placed by publishers. Content servers 110 and content pixel servers 112 may be configured to serve electronic content items across various domains of publishers, for example, based on information provided by content providers. Content servers 110 and content pixel servers 112 may also be configured to serve electronic content items based on contextual targeting of web sites, search results, and/or user profile information. In some embodiments, content servers 110 and content pixel servers 112 may be configured to serve ads based on ad tags served by content provider web servers 104 and/or publisher web servers 106, and on ad requests received from user devices 102. Content servers 110 and content pixel servers 112 may be configured to send and receive data from user devices 102, content provider web servers 104, publisher web servers 106, and/or DNS servers 108, over electronic network 100.

Content networks 114, such as advertising networks, provide content to online publishers, such as those operating publisher web server(s) 106, and may provide compensation to publishers for the service. Content providers may wish to place their content on certain publishers, and may provide instructions to the content networks 114 as to where to place content. For example, a content provider may wish to place promotional content on a website domain of certain criteria, and may enlist a content network 114 to accomplish this goal. In one situation, the content network 114 may receive a content request from a publisher web server 106 to serve content to a publisher uniform resource locator (URL), the publisher URL purporting to be associated with a domain matching the certain criteria. The content network 114 may retrieve content, for example, from a data store and provide it via a content server 110 to the publisher web server 106 for publishing. The publisher web server 106 may charge fees to the content network 114 for this service.

A problem arises because content networks 114 typically rely on some degree of human analysis and trust to verify, or not verify, that the publisher URL is indeed owned by, or otherwise legitimately associated with the desired domain. Malicious entities have become increasingly sophisticated at appearing to be associated with a certain domain ("spoofing" a domain), though they might actually be hosting a fraudulent webpage that is not visited by humans, but instead is only frequented by bots that visit and/or click on the content to generate revenue.

For example, a content provider may wish to purchase promotional content space on www.news.com. A content network 114 may receive a request from a publisher web server 106 seeking promotional content for a website URL that is apparently owned by www.news.com. The content network 114 may provide the electronic content to the website URL, and pay the publisher of the website URL, for example, per thousand impressions (CPM), per click, etc. However, it may turn out that the website URL is not in fact owned by or affiliated with www.news.com. Further, any clicks or views generated by the website URL may in fact be generated by bots. Bot networks, or botnets, employ software to mimic users navigating a web browser in order to generate fake views or clicks and collect fees from content networks 114 and content providers 104.

Techniques discussed herein allow publishers to cryptographically prove that they are the legitimate owners of a domain, and may allow content networks 114 to deny any requests that are fraudulently claiming to be associated with legitimate domains.

Figure 2:
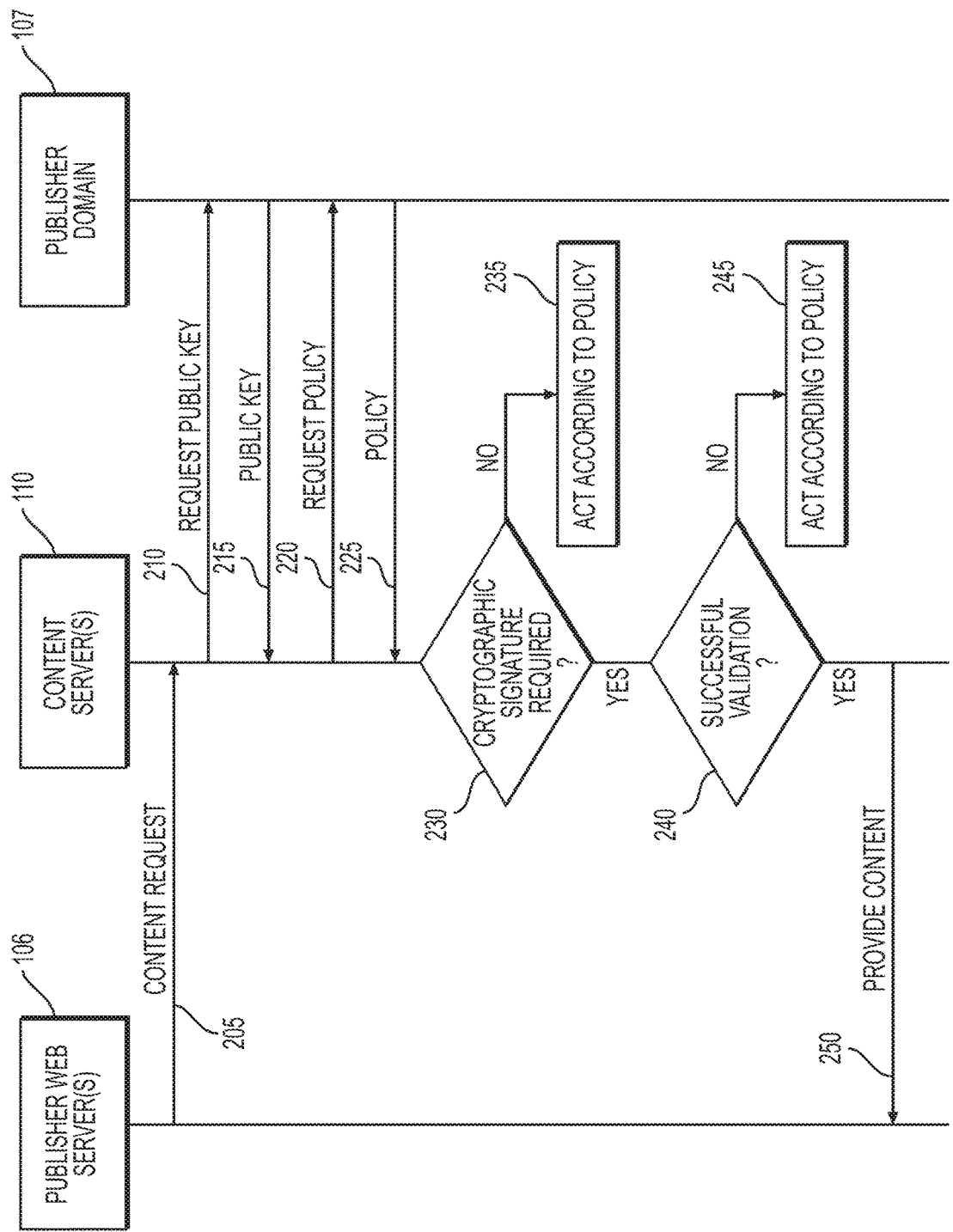
FIG. 2 is a flow diagram of a method for cryptographic signing of content requests, according to an exemplary embodiment of the present disclosure.

FIG. 2 is a flow diagram of a method for cryptographic signing of content requests, according to an exemplary embodiment of the present disclosure. Publisher domains 107 may publish public keys for cryptographic signature validation purposes, and one or more policies regarding URL validation requirements for the domain. At step 205, a publisher web server 106 may request, from a content server 110, content for display on a publisher URL. While a publisher web server 106 is depicted in FIG. 2, the content request may actually be received from the user device 102 that has requested content from the publisher web server 106. The publisher web server 106 may appear to be, and/or claim to be, associated with a certain publisher domain 107. At step 210, the content server 110 may request the public key from the publisher domain 107 associated with the publisher URL. At step 215, the publisher domain 107 may provider the public key. At step 220, the content server 110 may also request one or more policies regarding URL validation requirements for the publisher domain 107, which may be provided at step 225. The publisher domain 107 may be a trusted server owned by the publisher domain, or may be an associated server or entity, such as one or more DNS servers 108. Public keys and/or policies may be made available, for example, via an application programming interface (API).

At step 230, it may be determined if a cryptographic signature is present in content request. Such a cryptographic signature may be provided as, for example, a JavaScript Object Notation web token (JWT). It may also be determined if the one or more policies of the domain requires that cryptographic signatures be provided with content requests. If a cryptographic signature is not required, and the content request does not contain a cryptographic signature, the content server 110 may follow a domain policy in accepting or rejecting the content request.

Domain policies may include preferences for reporting activity to the domain, advertising pools, preferences for what to do in case of validation failure, when to provide static images, etc. For example, a publisher may want to be informed of improper content requests, with all improper requests served an advertisement for the publisher's subscription news offering. Such a policy may potentially provide value if the request is legitimate traffic, while not carrying any risk to the publisher of negative publicity.

Alternatively, the content server 110 may reject all content requests lacking a cryptographic signature according to the policy of the content network 114. Alternatively, the content server 110 may forward the content request to the publisher domain 107 along with a request for a cryptographic signature. Thus, the content server 110 or other third party may choose to follow domain policies, but may ignore the domain policies, at least in certain circumstances.

If a cryptographic signature is required, yet not provided in the content request 205, the content server 110 may automatically reject the content request. If the cryptographic signature is required, and provided in the content request, the content server 110 may validate the cryptographic signature using the public key in step 240. If the content request is not successfully validated, the content request may be granted or denied according to the policy of the publisher domain 107. For example, the policy may require informing the publisher domain 107 if a cryptographic signature validation associated with the publisher domain 107 should fail. Alternatively, the content server 110 may deny all content requests when the cryptographic signature validation fails according to its own policy.

Validation of the cryptographic signature using the public key may both ensure that the content request is unmodified from its original version, and that it was truly sent by the publisher domain 107. The cryptographic signature also proves that the publisher was actually involved in the request, and that any targeting variables in the request were set by the publisher. In many reporting and tracking systems, browsers are simply assumed to be telling the truth. However, in fraudulent systems, a single content request may present different information to the publisher domain 107, the tracking/reporting system used by the publisher domain 107 (for example, Omniture), and/or the content server 110. As a result, the traffic cannot be linked and the fraud is more difficult to identify. One benefit of techniques presented herein is that publishers may have more reliable and trackable reporting of their traffic.

If the validation of the cryptographic signature is successful, at step 250 content may be provided to the publisher web server 106. The publisher web server 106 may then provide the content to one or more user devices 102. Alternatively, the content server 110 may provide the content directly to the one or more user devices 102.

Validating cryptographic signatures may introduce a delay in webpage load time. Accordingly, if a content request arrives requesting content for a URL not previously known to the content network 114, the URL may be provisionally approved to receive content, and the content network 114 may validate the cryptographic signature asynchronously, or in batch. Further, once a given URL is successfully cryptographically validated, subsequent requests for content for this URL may be automatically approved. In this manner, any time delay associated with cryptographic validation of a URL would be limited to the first time the URL is accessed by a user.

Further techniques may be employed to reduce time delay in processing of content requests. For example, public keys and policies for given publisher domains may be cached locally in the content network 114, such as at content servers 110, to save transaction time. A risk-based analysis may also be performed by, for example, the content network 114, such as by content server(s) 110. Rather than immediately validating the content request, the claimed publisher associated with the request, the IP address of the request, the geographic location associated with the IP address, prior activities of the IP address, whether the IP address is flagged, etc. may be analyzed to determine if the content request will be granted. Such a risk-based analysis may be performed whether or not the content request is cryptographically signed.

Using any of these techniques, validation of the cryptographic signature of the content request may be delayed, but may be performed before any payment is provided to the publisher. In this manner, a content network 114 may deny payment to the sender of a content request, even if content has been provided to the sender, if it is later determined that the content request may be fraudulent. For example, a publisher claiming to be associated with www.news.com may be provided content in response to a content request, but may later be denied payment if later validation of the cryptographic signature, risk analysis, etc., identifies the publisher as potentially fraudulent, or as potentially not truly associated with wwww.news.com.

The content network 114 may require, as a matter of policy, that publisher domains 107 utilize public keys and cryptographic signatures in order to have their content requests processed successfully. The content network 114 may induce publisher domains 107 contractually, via content request denial, and/or via reminders to institute cryptographic signing in content requests.

In an effort to identify and track fraudulent activity, the content network 114 may further make data related to all content requests associated with a given domain available to the domain. In this way, domains may be able to determine if malicious entities are attempting to spoof the domain.

Figure 3:
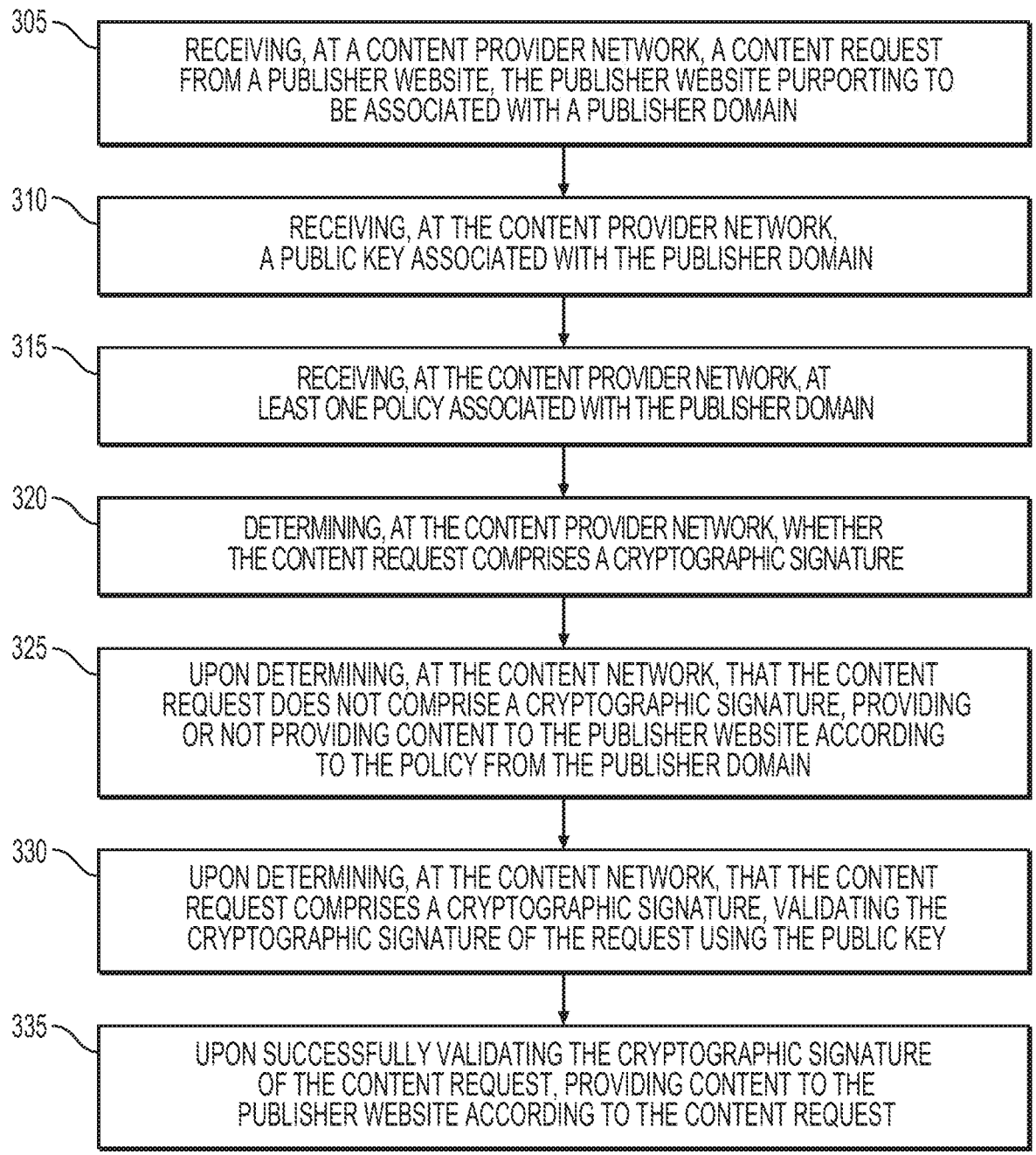
FIG. 3 is a flow diagram of a method cryptographic signing of content requests, according to an exemplary embodiment of the present disclosure.

FIG. 3 is a flow diagram of a method cryptographic signing of content requests, according to an exemplary embodiment of the present disclosure. At step 305, a content request may be received, at a content network and from a publisher website, the publisher website purporting to be associated with a publisher domain. At step 310, a public key may be received, at the content network, associated with the publisher domain. At step 315, at least one policy may be received, at the content network, associated with the publisher domain. At step 320, it may be determined, at the content network, whether the content request comprises a cryptographic signature. At step 325, upon determining, at the content network, that the content request does not comprise a cryptographic signature, content may be or may not be provided to the publisher website according to the policy from the publisher domain. At step 330, upon determining, at the content network, that the content request comprises a cryptographic signature, the cryptographic signature of the request may be validated using the public key. At step 335, upon successfully validating the cryptographic signature of the content request, content may be provided to the publisher website according to the content request.

Figure 4:
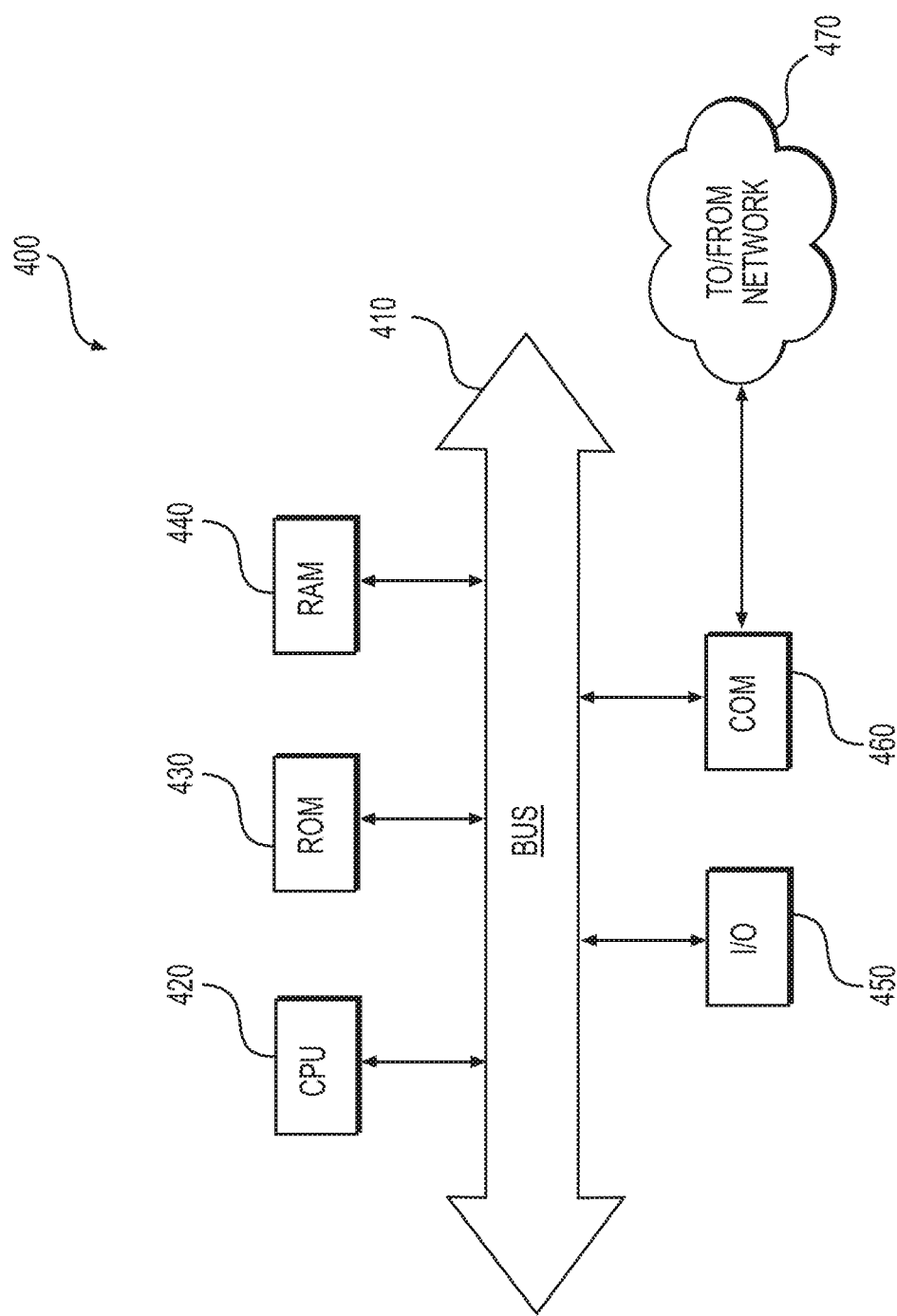
FIG. 4 provides a functional block diagram illustration of general purpose computer hardware platforms.

FIG. 4 provides a functional block diagram illustration of general purpose computer hardware platforms. FIG. 4 illustrates a network or host computer platform 400, as may typically be used to implement a server, such as a content server 110, or any other server used in techniques discussed in techniques presented herein. It is believed that those skilled in the art are familiar with the structure, programming and general operation of such computer equipment and as a result the drawings should be self-explanatory.

A platform for a server or the like 400, for example, may include a data communication interface for packet data communication 460. The platform may also include a central processing unit (CPU) 420, in the form of one or more processors, for executing program instructions. The platform typically includes an internal communication bus 410, program storage and data storage for various data files to be processed and/or communicated by the platform such as ROM 430 and RAM 440, although the server 400 often receives programming and data via network communications 470. The hardware elements, operating systems and programming languages of such equipment are conventional in nature, and it is presumed that those skilled in the art are adequately familiar therewith. The server 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Techniques presented herein improve the technical field in content provision networks, and solves problems arising in the post-Internet era. Currently, it is not possible to easily and quickly guarantee that a URL is owned by or associated with a given domain. Techniques presented herein may provide such a guarantee, and may prevent many millions of dollars in fraud from occurring each year. In addition, techniques such as asynchronous validation and batching further help guarantee that content may be provided without sacrificing speed, despite the computationally intense cryptographic validation techniques that may be employed. Further, techniques presented herein may provide domains with an enhanced ability to assert policies regarding content distribution security within their domain. Further, fraudulent content requests commonly present different data to content servers, publisher domains, and/or publisher domain analytics trackers, thus making identifying fraudulent traffic more difficult. Techniques presented herein help guarantee that data is presented in a unified manner, thus ensuring more reliable reporting of content request traffic.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for validating the identity of publisher websites, the method including:
   receiving, at a content network, a content request from a publisher website, the publisher website purporting to be associated with a publisher domain;
   receiving, at the content network, a public key associated with the publisher domain;
   receiving, at the content network, at least one policy associated with the publisher domain;
   determining, at the content network, whether the content request comprises a cryptographic signature;

upon determining, at the content network, that the content request does not comprise a cryptographic signature, providing or not providing content to the publisher website according to the policy from the publisher domain;

upon determining, at the content network, that the content request comprises a cryptographic signature, validating the cryptographic signature of the request using the public key; and upon successfully validating the cryptographic signature of the content request, providing content to the publisher website according to the content request.

2. The method of claim 1, wherein the content network induces the publisher domain to add cryptographic signatures to content requests.

3. The method of claim 1, further comprising:
upon determining that the content request does not comprise a cryptographic signature, forwarding information associated with the content request to the publisher domain.

4. The method of claim 1, further comprising:
upon determining that the content request does not comprise a cryptographic signature, forwarding the content request to the publisher domain with a request for a corresponding cryptographic signature.

5. The method of claim 1, further comprising:
upon successfully validating the cryptographic signature of the content request, providing content to the publisher website for additional content requests from the publisher website without validation.

6. The method of claim 1, further comprising:
receiving a plurality of content requests from the publisher domain; and
validating cryptographic signatures associated with the content requests in a batch.

7. The method of claim 1, further comprising:
determining that the policy from the publisher domain requires all content requests associated with the publisher domain to be cryptographically signed; and
upon determining that the content request does not comprise a cryptographic signature, denying the content request.

8. The method of claim 1, wherein the publisher key is received from a Domain Name Server associated with the publisher domain.

9. A system for validating the identity of publisher websites, the system including:
a data storage device storing instructions for validating the identity of publisher websites; and
a processor configured to execute the instructions to perform a method including:
receiving, at a content network, a content request from a publisher website, the publisher website purporting to be associated with a publisher domain;
receiving, at the content network, a public key associated with the publisher domain;
receiving, at the content network, at least one policy associated with the publisher domain;
determining, at the content network, whether the content request comprises a cryptographic signature;
upon determining, at the content network, that the content request does not comprise a cryptographic signature, providing or not providing content to the publisher website according to the policy from the publisher domain;

upon determining, at the content network, that the content request comprises a cryptographic signature, validating the cryptographic signature of the request using the public key; and upon successfully validating the cryptographic signature of the content request, providing content to the publisher website according to the content request.

10. The system of claim 9, wherein the content network induces the publisher domain to add cryptographic signatures to content requests.

11. The system of claim 9, the method further comprising:
upon determining that the content request does not comprise a cryptographic signature, forwarding information associated with the content request to the publisher domain.

12. The system of claim 9, the method further comprising:
upon determining that the content request does not comprise a cryptographic signature, forwarding the content request to the publisher domain with a request for a corresponding cryptographic signature.

13. The system of claim 9, the method further comprising:
upon successfully validating the cryptographic signature of the content request, providing content to the publisher website for additional content requests from the publisher website without validation.

14. The system of claim 9, the method further comprising:
receiving a plurality of content requests from the publisher domain; and
validating cryptographic signatures associated with the content requests in a batch.

15. The system of claim 9, the method further comprising:
determining that the policy from the publisher domain requires all content requests associated with the publisher domain to be cryptographically signed; and
upon determining that the content request does not comprise a cryptographic signature, denying the content request.

16. The system of claim 9, wherein the publisher key is received from a Domain Name Server associated with the publisher domain.

17. A non-transitory computer-readable medium storing instructions that, when executed by a computer, cause the computer to perform a method validating the identity of publisher websites, the method including:
receiving, at a content network, a content request from a publisher website, the publisher website purporting to be associated with a publisher domain;
receiving, at the content network, a public key associated with the publisher domain;
receiving, at the content network, at least one policy associated with the publisher domain;
determining, at the content network, whether the content request comprises a cryptographic signature;
upon determining, at the content network, that the content request does not comprise a cryptographic signature, providing or not providing content to the publisher website according to the policy from the publisher domain;
upon determining, at the content network, that the content request comprises a cryptographic signature, validating the cryptographic signature of the request using the public key; and
upon successfully validating the cryptographic signature of the content request, providing content to the publisher website according to the content request.

18. The computer-readable medium of claim 17, further comprising:
   upon determining that the content request does not comprise a cryptographic signature, forwarding the content request to the publisher domain with a request for a corresponding cryptographic signature.

19. The computer-readable medium of claim 17, further comprising:
   upon successfully validating the cryptographic signature of the content request, providing content to the publisher website for additional content requests from the publisher website without validation.

20. The computer-readable medium of claim 17, further comprising:
   receiving a plurality of content requests from the publisher domain; and
   validating cryptographic signatures associated with the content requests in a batch.

* * * * *